United States Patent Office 2,861,901
Patented Nov. 25, 1958

2,861,901
BROMINE CONTAINING NITRILO METHYLOL-PHOSPHORUS POLYMERS

Wilson A. Reeves, Carl Hamalainen, and John D. Guthrie, New Orleans, La., assignors to the United States of America as represented by the Secretary of Agriculture No Drawing. Application November 9, 1954
Serial No. 467,898

17 Claims. (Cl. 117—136)

(Granted under Title 35, U. S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This invention relates to cross-linked liquid or solid polymers which contain phosphorus, nitrogen and bromine in the form of stable chemical components and which are particularly suited for reducing the flammability of organic textiles.

Prior work has resulted in the development of a variety of polymers capable of being produced by condensation and/or esterification reactions involving tetrakis(hydroxymethyl) phosphonium chloride, which has the formula $(HOCH_2)_4PCl$, and is abbreviated THPC, and/or tris-(hydroxymethyl) phosphine oxide, which has the formula $(HOCH_2)_3PO$, and is abbreviated THPO. The methylol-phosphorus, i. e., $PCH_2OH$ groups, of each of these compounds are capable of either: (1) condensing with a compound which is capable of condensing with formaldehyde; or, (2) being esterified by an esterifying agent which is capable of esterifying methanol.

The term "phosphorus compounds" is hereinafter used only to refer to compounds of the group, THPC, THPO, and derivatives of either of them which contain a plurality of methylol-groups attached to phosphorus. The polymers capable of being produced by condensation and/or esterification reactions of the phosphorus compounds can be produced in the form of cross-linked polymers or thermosetting resins; and, hereinafter, these polymers are referred to by the term "methylol-phosphorus" polymers or resins. The compounds capable of either condensing with formaldehyde or esterifying methanol are hereinafter referred to by the term "methylol-reacting compounds."

The methylol-phosphorus polymers are characterized by recurring structural units containing phosphorus atoms in radicals of the group $(-CH_2)_4PCl$ and $(-CH_2)_3PO$. Methylol-phosphorus alkyds are produced by reacting at least one of the phosphorus compounds with at least one polycarboxylic acid esterifying agent. Phenolic methylol-phosphorus polymers are produced by reacting at least one of the phosphorus compounds with at least one phenolic compound.

The methylol-phosphorus polymers are inter-reactable. For example, a further polymerizable polymer of THPC with a nitrilo compound, that is, a compound containing the structure

such as, melamine, can be reacted with, for example, a phenolic compound such as bromohydroquinone, to produce a methylol-phosphorus polymer containing chemically bound residues of both melamine and bromohydroquinone. Also, a further polymerizable polymer of THPO with a polycarboxylic acid esterifying agent, such as, phthalic anhydride can be reacted with the foregoing further polymerizable polymer of THPC and melamine to produce a methylol-phosphorus polymer containing chemically bound residues of both melamine and phthalic acid, in addition to the residues of the phosphorus compounds.

Certain nitrogen containing methylol-phosphorus polymers, which are hereinafter referred to as "nitrilo" methylol-phosphorus polymers or resins, are particularly useful as textile flammability retardants. These resins are adapted to being partly or completely formed within the textile by impregnating the textile with an aqueous solution or dispersion of their resin forming reactants, and causing the reactants to react in situ until an insolubilized resin is produced. The nitrilo methylol-phosphorus polymers are capable of being produced by condensing at least one of the phosphorus compounds, with the elimination of water, with at least one organic nitrogen compound having a molecular weight of not more than about 800 and containing at least one trivalent nitrogen atom and at least two members of the group H and $CH_2OH$ attached to trivalent nitrogen atoms. This class of organic nitrogen compounds is hereinafter referred to by the term "nitrogen compounds." Methods of producing the nitrilo methylol-phosphorus polymers and employing them to reduce the flammability of textiles are more completely described in copending patent applications, Serial No. 378,437, filed September 3, 1953; Serial No. 393,021, now Patent No. 2,772,188, and Serial No. 393,023, now Patent No. 2,795,569, both filed November 18, 1953. The nitrilo methylol-phosphorus polymers are cross-linked phosphorus and nitrogen containing polymers in which the recurring structural units each contain a phosphorus atom that is a component of a radical of the group $(-CH_2)_4PCl$ and $(-CH_2)_3PO$ and is linked to at least two trivalent nitrogen atoms by connecting structures of the group $-CH_2-$ and $-CR_2OCR_2-$ where R is a member of the group hydrogen and alkyl radicals.

While the nitrilo methylol-phosphorus polymers are particularly good textile flammability reducing agents, the production of such an agent which imparts the maximum reduction in textile flammability per part of resinous impregnant is one of the goals being sought in the field of imparting flame resistance to textile materials.

A primary object of the present invention is to provide certain unique nitrilo methylol-phosphorus textile flammability reducing agents which retain the advantageous effects of the previously described nitrilo methylol-phosphorus polymers in that they impart only a slight reduction of desirable textile properties such as hand, feel, tear strength, and the like, but which unique polymers impart a materially greater degree of flame resistance per part of resinous impregnant.

Heretofore, the efficiency of the nitrilo methylol-phosphorus polymers (the amount of flame resistance imparted per part unit weight of impregnant) seemed to be substantially completely dependent upon the amount and ratio of nitrogen and phosphorus contained in the polymers. The presence or absence of halogen seemed to exert little, if any, effect upon the efficiency. For example, a nitrilo methylol-phosphorus polymer produced under conditions yielding a polymer containing from about 1 to 12% chlorine exhibits substantially the same efficiency as one containing the same amount and ratio of nitrogen and phosphorus, produced under conditions yielding a substantially halogen free polymer; whereas one containing an appreciably different amount or ratio of nitrogen and phosphorus exhibits an appreciably different efficiency.

We have now discovered that nitrilo methylol-phosphorus polymers which have a nitrogen and phosphorus content within certain ranges of amounts and ratios which also contain a certain proportion of firmly attached bromine exhibit a flame reducing efficiency which is materially greater than that of polymers which differ only in the absence of the bromine.

In general, in accordance with the present invention, bromine containing nitrilo methylol-phosphorus polymers are produced by reacting reactants of the group, phosphorus compounds, polyfunctional nitrogen compounds, and polyfunctional methylol-reacting compounds (as defined above) containing bromine atoms attached to carbon atoms, selected so that phosphorus contained in the phosphorus compounds amounts to at least 1% of the total weight of the mixed reactants and so that from about 0.5 to 20 parts of nitrogen contained in nitrilo groups and from 0.3 to 15 parts of bromine in the form of bromine atoms attached to carbon atoms are present per part of phosphorus contained in the phosphorus compounds, and continuing the reaction until substantially all of the reactants become chemically combined into a homogeneous polymer.

Throughout the specification and claims, the term "parts" and "percent" are used only to refer to parts or percent by weight.

The reactants from which the bromine containing nitrilo methylol-phosphorus polymers are produced can be monomeric or polymeric compounds, or mixtures thereof. For example, the reaction mixture (the mixture of reactants that combine to form the polymers) can comprise a mixture of: THPC, melamine and 2,4-dibromohydroquinone (a phosphorus compound, a nitrogen compound, and a bromine containing methylol-reacting compound); or, a further polymerizable THPC-urea polymer and 2,3-dibromosuccinic acid (a phosphorus compound which is also a nitrogen compound and a bromine containing methylol-reacting compound), THPO and a partially brominated diallyl melamine (a phosphorus compound and a nitrogen compound which is also a bromine containing methylol-reacting compound); or a further polymerizable THPO-2,4-dibromohydroquinone polymer and a further polymerizable melamine THPC-2,3-dibromosuccinic acid polymer (a phosphorus compound which is also a bromine containing methylol-reacting compound, and a nitrogen compound which is also a phosphorus compound and also a bromine containing methylol-reacting compound); a bromo derivative of THPC or THPO and THPC and melamine or methylolmelamine; or any combination of such reactants selected to provide the specified amounts and ratios of phosphorus, nitrogen and bromine.

The bromine containing nitrilo methylol-phosphorus polymers provided by this invention can be produced in the form of liquid or solid polymers. They are homogeneous cross-linked polymers characterized by a particularly high resistance to burning and the property of imparting a particularly high resistance to burning of other materials. In liquid form they are characterized by a tendency to be soluble or dispersible in water and to be converted to insolubilized solid resins either by heating them to a moderately elevated temperature, or by reacting them with ammonia at temperatures below about 30° C. In their insolubilized solid form they are characterized by a strong resistance to attack by dilute acids, bases, organic solvents and the like. These polymers are generally useful wherever cross-linked polymers are useful. Illustrative examples of suitable uses include their use in the production of molded synthetic plastic articles, such as buttons, containers, electrical insulators and the like; synthetic coatings such as paints, varnishes, and the like; adhesives; and impregnating agents for textiles, ropes, paper and the like.

Textiles impregnated with a liquid containing the nitrilo methylol-phosphorus resin forming materials are preferably dried by heating them to from about 60 to 125° C. for from about 2 to 15 minutes with the lower temperature being used with the longer time, to evaporate volatile materials. The insolubilization of the nitrilo methylol-phosphorus resin forming materials can be accomplished thermally by heating the textiles containing them to a temperature of from about 125 to 170° C. for from about 2 to 15 minutes with the lower temperature being used with the longer time. Alternatively, the insolubilization can be accomplished by reacting the resin forming materials in situ in the textile with ammonia, preferably by the process described in the aforementioned copending application Serial No. 393,021, filed November 18, 1953, now Patent No. 2,772,188.

The bromine containing nitrilo methylol-phosphorus polymers are particularly suited for use in the impregnation of organic textiles to reduce their flammability. These polymers can be used in the treatment of vegetable textile materials such as cotton, flax, linen, ramie, and the like, chemically modified vegetable textile materials such as cyanoethylated, carboxymethylated, aminoethylated cottons and the like; regenerated cellulosic textiles such as the viscose or acetate rayons; or proteinaceous textiles such as silk, wool, and the like. The textile materials can be treated in the form of slivers, yarns, threads, or fabrics. The polymers can be separately formed or can be produced in situ in the textile by a reaction of materials with which the textile is impregnated. The polymers can be used as the only material with which the textile is impregnated or used in conjunction with other textile flameproofing, creaseproofing, wrinkleproofing and the like textile treating agents; or in conjunction with textile lubricants, water repellents, and the like textile treating agents.

A preferred process of producing the bromine containing nitrilo methylol-phosphorus polymers comprises condensing at least one phosphorus compound capable of dissolving in aqueous sodium carbonate to yield a solution of THPO (i. e. THPC, THPO, or mixtures thereof) with at least one organic nitrogen compound (i. e. an organic nitrogen compound having a molecular weight of less than 800 and containing a plurality of nitrilo N-linked hydrogen atoms or methylol groups) which contains enough bromine atoms attached to carbon atoms to provide from about 0.5 to 10 parts of bromine per part of nitrogen, using proportions of reactants of such that the mixed reactants contain at least about 1% phosphorus which is present in phosphorus compounds, and continuing the reaction until substantially all of the reactants combine.

The mole ratios of such phosphorus compounds to such nitrogen compounds that yield mixtures of reactants in the specified proportions vary widely depending upon: the proportions of phosphorus, nitrogen, and bromine present in the reactants and desired in the polymer and the proportion of methylol-reacting functional groups contained in the nitrogen compound. However, whenever the structures of the reactants are known, the mole ratios providing the necessary amounts of the reactants can be calculated. In the reaction, the reactants can be assumed to combine by means of their respective functional groups in accordance with the equations, $$PCH_2OH + HN \rightarrow PCH_2N + H_2O$$

$$PCH_2OH + HOCH_2N \rightarrow PCH_2OCH_2N + H_2O$$

In any case, by a simple series of test reactions conducted under the reaction conditions desired to be used, the proper proportion of reactants can readily be decided.

Another preferred process of producing the bromine containing nitrilo methylol-phosphorus polymers comprises condensing at least one further polymerizable nitrilo methylol-phosphorus polymer that contains a plurality of the methylol-phosphorus groups of the parent phosphorus compound with at least one other further polymerizable methylol-phosphorus compound which contains both the plurality of methylol-phosphorus groups and a plurality of bromine atoms attached to carbon atoms, using proportions of reactants of such that the mixed reactants contain at least about 1% of phosphorus and from about 0.5 to 20 parts of nitrogen and from about 0.3 to 15 parts of bromine per part of phosphorus present in the phosphorus compounds. In the impregnation of textiles and the like, the process is advantageously conducted by impregnating the textile with the further polymerizable polymers and reacting the polymers in situ.

The phosphorus compounds which can be used in the practice of this invention comprise at least one member of the group THPC, THPO and compounds derived from either of them which contains a plurality of the methylol-phosphorus groups of the parent compounds. The derivative phosphorus compounds are the products of reacting THPC, THPO or a mixture thereof, with a compound reactive therewith until some but not all of the methylol-phosphorus groups of THPC or THPO react. The derivative phosphorus compounds can be monomers in which a plurality of methylol-phosphorus groups are attached to a single phosphorus atom, or further polymerizable polymers in which some or all of a plurality of methylol-phosphorus groups are attached to different phosphorus atoms in the polymer molecules.

While the phosphonium salt phosphorus compounds are usually used in form of phosphonium chloride, other phosphonium salts can be used. For example, THPC can be replaced by the analogous phosphate

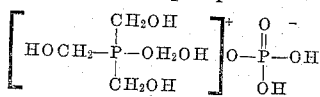

or the acetate

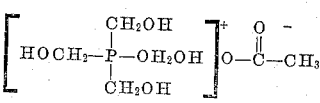

or the like phosphonium salts; and the phosphonium salt derivatives of THPC can be replaced by the analogous phosphonium salts of acids other than hydrochloric acid.

Illustrative examples of suitable polyfunctional methylol-reacting compounds which are capable of condensing with formaldehyde include: polyamines such as melamine, ethylenediamine, tetramethylenepentamine, and the like; aromatic amines such as a phenylenediamine, and the like; imines such as ethylenimine, and the homologs of the polymers of ethylenimine, and the like; amido compounds such as guanidine, urea, and alkylated and methylated homologs and analogs; cyanamide and the like; amino acids such as glysine, lysine, arginine and the like; and the bromine analogs of any such organic nitrilo compounds. These compounds can either be employed as one or all of (a) a polyfunctional nitrogen compound or (b) a methylol-reacting compound containing bromine selected as a reactant for the production of a bromine containing nitrilo methylol-phosphorus polymer or (c) a reactant for partial reaction with THPC or THPO to produce a nitrilo group containing derivative phosphorus compound.

Other suitable nitrilo group containing derivative phosphorus compounds can be produced by a similar partial reaction of THPC, THPO, or a mixture thereof with the analogous organic nitrilo compounds which contain only one member of the group H or CH$_2$OH attached to a trivalent nitrogen atom. Illustrative examples of such monofunctional nitrilo compounds (monofunctional in that they contain a single methylol-reacting functional group) include: open chain polyamines such as N,N,N'-trimethyl ethylenediamine; alicyclic amines such as cyclohexylamine, cyclopentylamine, methylolated cyclohexylamines, and N-butyl cyclohexyl amine; aromatic amines such as aniline and pyrrole; aliphatic amines such as diethanolamine; amides such as acrylamide and N-allyl acrylamide; amino acids such as N-methyl glysine; and the bromo analogs of any such nitrilo compounds that contain at least one bromine atom attached to a carbon atom that is attached to another carbon atom.

Illustrative examples of polyfunctional methylol-reacting compounds which are capable of condensing with formaldehyde also include: phenols and naphthols and halo- and/or hydrocarbon-substituted phenols and naphthols such as phenol, vinylphenol, resorcinol, catechol, hydroquinone, phloroglucinol, para-tertiaryamylphenol, allylphenol, ortho-bromophenol, bromo-hydroquinone, 2,4-dibromo-1-naphthol, and the like.

Any of the above phenolic compounds can be partially reacted with THPC, THPO, or a mixture thereof to produce a monomeric or polymeric compound which contains at least two methylol-phosphorus groups and which is aromatic group containing derivative phosphorus compound suitable for employment in the present process.

Illustrative examples of polyfunctional methylol-reacting compounds which are capable of esterifying methyl alcohol include: saturated aliphatic polycarboxylic acids, such as oxalic, malonic, methylsuccinic, malic, tartaric, citric and like acids; unsaturated aliphatic polycarboxylic acids, such as maleic, itaconic, aconitic and like acids; alicyclic polycarboxylic acids, such as pinic, homopinic, the hexahydrophthalic and like acids; aromatic polycarboxylic acids, such as the phthalic, the benzene-tricarboxylic, diphenic, chlorendic, and like acids; polycarboxylic acid anhydrides, such as succinic, maleic, phthalic, chlorendic, and the like acid anhydrides; and polycarboxylic acid halides, such as oxalyl, succinyl, the phthalyl, and the like acid halides.

Any of the above polycarboxylic acid esterifying agents or their monocarboxylic acid analogs can be partially reacted with THPC, THPO or mixtures thereof to produce monomeric or polymeric compounds which are suitable for use in the present process and which contain at least two methylol-phosphorus groups and ester groups.

A class of nitrogen compounds which is particularly suitable for employment (either as a polyfunctional methylol-reacting compound selected as a reactant in the production of a bromine containing nitrilo methylol-phosphorus polymer, or, as a compound with which THPC, THPO or a mixture thereof is reacted to produce a nitrilo group containing derivative phosphorus compound) comprises derivatives of N-substituted melamines with contain at least one bromine atom attached to a carbon atom and at least two members of the group H and CH$_2$OH attached to trivalent nitrogen atoms.

The N-substituted melamines are compounds of the formula

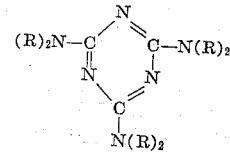

in which R represents radicals of the group hydrogen, methylol, alkyl and alkenyl radicals and in which at least one R is an alkenyl radical. The alkenylated melamines in which the alkenyl radicals are terminally unsaturated radicals of from 2 to 6 carbon atoms are preferred; and those in which the alkenyl radicals are terminally unsaturated allylic radicals are particularly preferred. Illustrative examples of suitable N-alkenylated melamines include: melamines in which from 1 to 5 of the N-linked hydrogen atoms have been replaced with allyl radicals, metallyl radicals, 4-pentenyl radicals, and the like radicals; and the methylol derivatives of such alkenylated melamines.

One class of derivatives of N-alkenylated melamines which contain at least one bromine atom attached to a carbon atom and also contain at least two members of the group H and CH$_2$OH, which are suitable for employment in the present process comprise the products of brominating an N-alkenylated melamine containing at least two members of the group H and CH₂OH attached to nitrogen atoms. Such derivatives can be produced by brominating the specified melamines by means of the usual procedures and apparatus for brominating N-alkenyl amino compounds. The procedure used was to dissolve the amino compound in an organic solvent and subsequently adding the stoichiometric quantity of bromine.

Illustrative examples of such derivatives include N-N-bis(2,3-dibromopropyl) melamine, 1,2-dibromopropionamide, and the like.

In the case of derivaties of N-alkenylated melamines those which can be used in the present process comprise the addition products of an N-alkenylated melamine containing at least two members of the group H and CH₂OH attached to trivalent nitrogen atoms and a bromine containing polyhalo $C_{1-2}$ hydrocarbon containing at least two atoms of the group Cl and Br attached to the same carbon atom.

We have discovered that novel addition compounds of N-alkenylated melamines are capable of being produced by an addition reaction between a mixture of reactants, of groups (a) through (c), which mixture contains at least one compound of both groups (a) and (b), where group (a) consists of a polymerizable N-alkenylated melamine, group (b) consists of polyhalohydrocarbons capable of yielding addition products with olefins, and group (c) consists of lower aliphatic aldehydes. Such addition reactions can be initiated by Friedel-Crafts type catalyst or by free radical reaction initiators. The use of the latter type of initiator is preferred. The reaction can be conducted in an aqueous or a water soluble or a water insoluble organic liquid reaction medium. The addition compounds can be produced in the form of liquid or solid monomeric or polymeric addition compounds. They are generally useful wherever monomeric or polymeric halogen containing alicyclic amino compounds are useful and the polymeric addition compounds, especially when produced in the form of an aqueous emulsion, are particularly useful textile impregnants which materially reduce the flammability of organic textiles.

The compounds of group (b) can be any polyhalohydrocarbon capable of entering into the reaction represented by the equation:

$$CX_2 + C=C \rightarrow CXCX$$

but the compounds of the formula

and

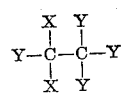

where X represents an atom of the group bromine and chlorine, and Y represents an atom of the group bromine, chlorine, and hydrogen are preferred. The compounds of group (c) can be any aldehyde capable of forming the aminoplast type of resins; but formaldehyde is particularly preferred.

Where such addition compounds are produced from an N-alkenylated melamine containing at least two H or CH₂OH groups attached to a trivalent nitrogen atom and a polyhalohydrocarbon of the above formula in which X represents a bromine atom, the addition compounds are derivatives of N-alkenylated melamines which are particularly suitable for employment in the present process.

Another class of derivatives of nitrogen compounds containing bromine which can be employed in the present process comprise polymeric addition products of an aliphatic acrylamide containing at least one group of the formula

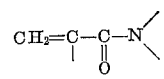

and at least two atoms of the group H and CH₂OH attached to trivalent nitrogen atoms, and a bromine containing polyhydrocarbon containing at least two atoms of the group, bromine and chlorine, attached to the same carbon atom.

We discovered that novel addition compounds are capable of being produced by an addition reaction between a mixture, of reactants of group (a) through (c), which mixture contains at least one compound of both groups (a) and (b), where group (a) consists of compounds of the formula

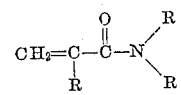

where R represents a hydrogen atom, an alkyl radical, a methylol radical, or a radical of the formula

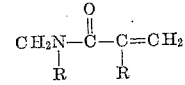

group (b) consists of the polyhalohydrocarbons defined by the group (b) above and group (c) consists of a lower aliphatic aldehyde. The use of the above defined preferred polyhalohydrocarbon and aldehyde reactants is preferred.

Such additional reactions can be initiated by a Friedel-Crafts type catalyst or a free radical reaction initiator. The use of the latter is preferred. The reaction can be conducted in an aqueous liquid or a water soluble or a water insoluble organic liquid reaction medium. The addition compounds can be produced in the form of liquid or solid polymeric compounds. They are generally useful wherever polymeric halogen containing aliphatic acylamides are useful and the polymeric addition compounds, especially when produced in the form of an aqueous emulsion, are particularly useful textile impregnants which materially reduce the flammability of organic textiles.

Free radical reaction initiators which can be used to initiate either of the above addition reactions include substantially any compounds which are susceptible to being decomposed to yield free radicals under the influence of heat, light, or fast elemental particles formed in the course of the reaction. Illustrative examples of suitable free radical reaction initiators include peroxides such as dibenzoyl peroxide, di-tertiary-butyl peroxide, hydrogen peroxide, alkali metal persulfates, benzoyl hydroperoxide, cumene hydroperoxide, and the like; azo compounds such as 2,2'-bisazoisobutyronitrile; ketones in conjunction with actinic light and the like reaction initiators. The peroxides and, where the reaction is conducted in an aqueous emulsion reaction medium, the water soluble peroxides, are particularly preferred reaction initiators.

In general, particularly valuable polymeric N-alkenylated melamine or aliphatic acrylamide polyhalohydrocarbon addition products are produced by reacting these unsaturated compounds, in the presence of a free radical reaction initiator, with a polyhalomethane of the formula $CX_2Y_2$ in which X represents bromine or chlorine atoms and Y represents bromine, chlorine, or hydrogen atoms. This class of compounds includes compounds of the formula, $CBr_4$, $CBr_3Cl$, $CBr_2Cl_2$, $CBr_3H$, $CBr_2H_2$, $CCl_4$, $CCl_3H$, and $CCl_2H_2$. Such polyhalomethanes containing at least two bromine atoms, e. g., $CBr_4$, $CBr_3Cl$, $CBr_2Cl_2$, and $CBrCl_3$ are particularly suitable.

In the reaction of those of the polymeric N-alkenylated melamine or aliphatic acrylamide-polyhalohydrocarbon addition products which contain bromine with THPC, THPO, or mixtures thereof, to produce a nitrilo group and bromine containing derivative phosphorus compound, the proportions of the reactants can be varied widely and the reaction can be conducted in the presence or absence of catalysts and/or solvents. A reaction conducted in an aqueous medium in the absence of a catalyst is preferred. The polymeric addition products can be isolated by the usual procedures for isolating polymers; or, where the phosphorus compounds produced are to be reacted with a polyfunctional methylol-reacting compound in accordance with the present process, the crude addition reaction mixture can be used per se, with no further purification.

These polymeric addition products, especially those containing relatively large proportions of bromine, are particularly useful as reactants from which to produce bromine containing nitrilo methylol-phosphorus textile impregnants. A particularly effective method of impregnating textiles with such polymers comprises impregnating the textile with (1) an emulsion capable of being produced by reacting a polyhalomethane and an N-alkenylated melamine or an aliphatic acrylamide in the presence of a free radical reaction initiator in an aqueous emulsion comprising the reactants, water and a small but effective amount of an emulsifying agent, and also with (2) an aqueous solution or emulsion of a monomeric phosphorus compound capable of dissolving in aqueous sodium carbonate to yield solutions of THPO and/or a nitrilo group containing derivative phosphorus compound of high nitrogen and phosphorus content and heating the so-impregnated textile to a moderately elevated temperature to produce the bromine containing nitrilo methylol-phosphorus polymer in situ in the textile.

The following examples are illustrative of certain details of the invention.

In the examples, the flame resistance of various resin impregnated cloths were compared by the "strip flame test" method. In this method a strip of the cloth, which is about half an inch wide and about 4 inches long, is supported at one end so that the strip extends toward some degree between 0 and 180 relative to a vertical azimuth. The unsupported ends of the cloth strips are ignited by contacting them with a flame until the cloth begins to burn. As soon as the cloth is ignited the flame used to ignite it is removed. The flammabilities of the cloths are compared on the basis that when so supported and ignited the cloths have a much greater tendency to burn when they extend straight down and are ignited at the bottom. Untreated cellulosic cloth will fail at 0 degrees (i. e. will burn when supported to extend straight up and ignited at the top). A very flame resistant cloth will pass at 180° (i. e. will not burn even when supported to extend straight down and ignited at the bottom), and a relatively flame resistant cloth will not fail except at some degree between about 90 and 180 (i. e. when supported to extend at least somewhat downwardly so that the flame is propagated at least somewhat upwardly). In the case of the cloths which pass at 180°, the number of seconds for which they continue to burn after the ignited flame is removed is noted. The most flame resistant cloths continue to burn for the least number of seconds.

EXAMPLE 1

*A bromine containing nitrilo methylol-phosphorus polyan N-alkenylated melamine*

10.4 grams N,N'-diallylmelamine were dispersed in 83.0 grams water containing 20 grams (37%) formaldehyde, 0.6 gram polyvinyl alcohol and 1.2 grams NaHCO$_3$. The initial pH was 8.0. The solution was heated and stirred to aid solution of the diallylmelamine. When the temperature reached 80° C., 27.0 grams of CHBr$_3$ were added, forming an emulsion. Then, 0.6 gram K$_2$S$_2$O$_8$ was added, as the catalyst. There was a drop in pH to 7.0. An additional 1.2 grams of NaHCO$_3$ were added. Heating and stirring was continued with the temperature maintained at 80–83° C. for 1 hour. The reaction produced a milky white, free-flowing, stable emulsion comprising a nitrogen and bromine containing polymeric addition product dispersed in an aqueous medium having a pH between about 7 and 8.

A sample of 8 oz. twill was padded with this emulsion. Wet pickup was 64.2%. It was dried six minutes at 100° C. and cured six minutes at 140° C. Its resin pickup after rinsing in water was 7.0%. The finished product passed the 45° angular flame test.

EXAMPLE 2

*A bromine containing nitrilo methylol-phosphorus polymer produced in situ on a textile and a comparison of its flammability retarding properties*

Another sample of 8 oz. twill was treated with a solution containing 25 parts of the emulsion of Example 1 and 75 parts THPC resin forming reactants (comprising an aqueous solution which contained 15.7% THPC, 10.0% water soluble methylolmelamine, 10.0% urea, and 3.0% triethanolamine). This sample had a wet pickup of 66.3%. It was dried 6 minutes at 100° C. and cured 6 minutes at 140° C. Its resin pickup after rinsing in water was 16.9%. It passed the 180° strip flame test and also the match test.

EXAMPLE 3

*A bromine containing nitrilo methylol-phosphorus polymer produced from a brominated diallylmelamine, THPC, and methylolmelamine*

A brominated diallylmelamine was produced by dissolving 10.3 grams of diallylmelamine in 50 grams of glacial acetic acid and slowly adding a solution of 16 grams of bromine in 50 grams of glacial acetic acid. Upon cooling the resulting solution a heavy white precipitate was formed. The precipitate was filtered off and washed with acetone. About 20 grams of a crystalline brominated diallymelamine melting above 230° C. (with decomposition) was produced.

A neutral aqueous solution of the brominated diallylmelamine was produced by dissolving 10 grams of the compound in 20 grams of an aqueous 37% formaldehyde solution and neutralizing the solution by the addition of sodium carbonate.

A textile impregnating solution was prepared by mixing the above solution of brominated diallylmelamine with a solution of 38 grams of THPC, 24 grams of a water soluble methylolmelamine, 24 grams of urea, and 6 grams of triethanolamine in 150 grams of water.

A sample of an 8 oz. cotton twill and an 8.5 oz. of cotton sateen were padded with the above textile treating solution. The impregnated cloths were dried for 6 minutes at 90° C. and cured for 6 minutes at 140° C. and washed and dried.

The impregnated cloth samples contained 18 and 19% of resin respectively. Samples of both impregnated cloths passed the strip flame test at 180° with about a 1 to 2 seconds afterflame.

EXAMPLE 4

*A polymeric addition product of a polyhalomethane and an aliphatic acrylamide*

*Produced in organic solvent.*—7.1 grams acrylamide and 27.1 grams bromoform were dissolved in 100 grams dioxane and heated with stirring to 80° C. Then 0.5 gram benzoyl peroxide was added and the heating and stirring was continued for 6 hours at 80–85° C. A precipitate was formed. After filtering and washing with acetone, 9 grams of a dry white powdery polymeric addition product containing bromine was obtained. The addition product was water insoluble.

*Produced in an aqueous emulsion.*—7.1 grams acrylamide were dissolved in 50 grams of water containing 0.6 gram polyvinyl alcohol. 15.2 grams of bromoform were added with stirring. An emulsion was formed. The emulsion was heated to 70° C. and 0.6 gram potassium persulfate was added. The heating and stirring was continued for 1 hour at approximately 80° C. A viscous solution resulted. The solution was poured into a large volume of alcohol with stirring. A stringy mass was formed. The product was washed in fresh alcohol and then acetone. After drying in the vacuum oven for 4 hours the product was an amorphous polymeric addition product weighing 9.0 grams.

EXAMPLE 5

*A bromine containing nitrilo methylol-phosphorus polymer produced from a polymeric addition product of a polyhalomethane and an aliphatic acrylamide*

A polymeric addition product was produced in aqueous emulsion by the procedure described in Example 4 using 7.1 grams acrylamide, 50 grams of water containing 0.6 gram of polyvinyl alcohol, 27 grams of bromoform and 0.6 gram of potassium persulfate. The reaction produced a cloudy, somewhat viscous solution.

A textile impregnating liquid was prepared by mixing 25 parts of the above solution with 75 parts of a THPC-resin forming solution (an aqueous solution containing 15.7% THPC, 10% Resloom HP, 10% urea, and 2.5% of triethanolamine).

A sample of an 8 oz. cotton twill was padded with the above liquid and cured, by heating it for about 6 minutes at 140° C. After it was washed and dried, the cloth, which appeared to be impregnated with a homogeneous bromine containing nitrilo methylol-phosphorus polymer exhibited a pronounced resistance to burning.

We claim:

1. A composition of matter produced by heating together acrylamide and bromoform in the presence of a catalyst selected from the group consisting of benzoyl peroxide and potassium persulfate.

2. A process for producing a flame-resistant composition of matter which comprises heating together, in the presence of a free radical reaction initiating catalyst, a nitrogen compound selected from the group consisting of a substituted melamine having the formula

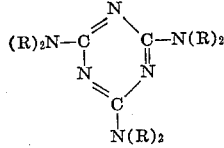

and an acrylamide having the formula

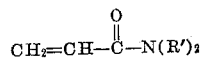

where R is selected from the group consisting of H— and a terminally unsaturated alkenyl radical having from 2 to 6 carbon atoms, from 1 to 5 of said R's being such alkenyl radical, and where R' is a radical selected from the group consisting of H— and lower alkyl, with a brominating agent selected from the group consisting of bromine and bromoform, then adding formaldehyde and an aqueous solution containing an organic trivalent nitrogen-containing compound and a phosphorus compound selected from the group consisting of tris(hydroxymethyl) phosphine oxide and tetrakis (hydroxymethyl) phosphonium chloride, and then heating to produce the flame-resistant composition of matter.

3. The process of claim 2 in which the proportions of reactants are so selected that the phosphorus in said phosphorus compound constitutes at least 1.0% of the total weight of the reactants, the nitrogen constitutes from about 0.5 to 20 parts per part of phosphorus, and the bromine constitutes from about 0.3 to 15 parts per part of phosphorus.

4. A process for producing a flame-resistant composition of matter which comprises heating a mixture of formaldehyde and a nitrogen compound selected from the group consisting of a substituted melamine having the formula

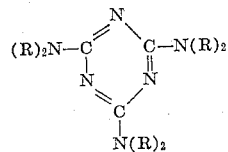

and an acrylamide having the fomrula

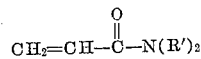

where R is selected from the group consisting of H— and a terminally unsaturated alkenyl radical having from 2 to 6 carbon atoms, from 1 to 5 of said R's being such alkenyl radical, and where R' is a radical selected from the group consisting of H— and lower alkyl, then adding a brominating agent selected from the group consisting of bromine and bromoform and a free radical reaction initiating catalyst, continuing the heating until a stable emulsion is formed, then adding an aqueous solution containing an organic trivalent nitrogen-containing compound and a phosphorus compound selected from the group consisting of tris(hydroxymethyl) phosphine oxide and tetrakis (hydroxymethyl) phosphonium chloride, and then further heating to produce the flame-resistant composition of matter.

5. A process for producing a fabric flammability reducing agent which comprises heating together in an aqueous medium in the presence of a free radical reaction initiating catalyst a nitrogen compound selected from the group consisting of a substituted melamine having the formula

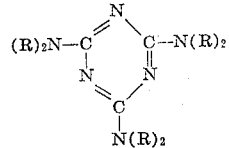

and an acrylamide having the formula

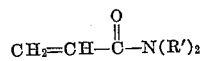

where R is selected from the group consisting of H— and a terminally unsaturated alkenyl radical having from 2 to 6 carbon atoms, from 1 to 5 of said R's being such alkenyl radical, and where R' is a radical selected from the group consisting of H—and lower alkyl, with a brominating agent selected from the group consisting of bromine and bromoform, and then adding formaldehyde and an aqueous solution containing an organic trivalent nitrogen-containing compound and a phosphorus compound selected from the group consisting of tris(hydroxymethyl) phosphine oxide and tetrakis (hydroxymethyl) phosphonium chloride.

6. The flame-resistant composition of matter produced by the process of claim 2.

7. A fabric flammability reducing agent which comprises an aqueous composition obtained by heating, in an aqueous medium and in the presence of a free radical reaction initiating catalyst, a compound selected from the group consisting of diallylmelamine and acrylamide and a compound selected from the group consisting of bromine and bromoform, and then adding formaldehyde and an aqueous solution containing an organic trivalent nitrogen-containing compound and a compound selected from the group consisting of tris(hydroxymethyl) phosphine oxide and tetrakis (hydroxymethyl) phosphonium chloride.

8. A fabric flammability reducing agent which comprises an aqueous composition obtained by heating a mixture of formaldehyde and a compound selected from the group consisting of diallylmelamine and acrylamide, then adding a brominating agent selected from the group consisting of bromine and bromoform and a free radical reaction initiating catalyst, further heating the mixture, and then adding an aqueous solution containing an organic trivalent nitrogen-containing compound and a compound selected from the group consisting of tris(hydroxymethyl) phosphine oxide and tetrakis (hydroxymethyl) phosphonium chloride.

9. A process for producing a flame-retardant composition of matter which comprises heating an aqueous mixture of diallylmelamine, formaldehyde, and an emulsifying agent, then adding bromoform and a catalytic amount of potassium persulfate, and then continuing the heating until a stable aqueous emulsion is produced.

10. The flame-retardant composition of matter obtained by the process of claim 9.

11. A method for flameproofing a fabric which comprises impregnating said fabric with the aqueous emulsion obtained by the process of claim 9, drying the impregnated fabric, and then insolubilizing the impregnant in situ at an elevated temperature.

12. A method of flameproofing a fabric which comprises impregnating said fabric with the composition obtained by the process of claim 5, drying the impregnated fabric, and then insolubilizing the impregnant in situ at an elevated temperature.

13. The process of claim 5 wherein the nitrogen compound is diallylmelamine, the brominating agent is bromine, and the phosphorus compound is tetrakis (hydroxymethyl) phosphonium chloride.

14. A process for flameproofing a fabric which comprises impregnating said fabric with an aqueous composition comprising tetrakis(hydroxymethyl) phosphonium chloride and a polymeric condensation product of diallylmelamine, formaldehyde, and bromoform, impregnating a fabric with the resulting aqueous mixture, drying the impregnated fabric, and then insolubilizing the impregnant in situ at an elevated temperature.

15. A process for flameproofing a fabric which comprises impregnating said fabric with the composition produced by the process of claim 13, drying the impregnated fabric, and then insolubilizing the impregnant in situ at an elevated temperature.

16. A process for producing a fabric flammability reducing composition which comprises heating an aqueous solution of acrylamide with bromoform in the presence of a catalytic amount of potassium persulfate to produce a solution of a bromoform-acrylamide addition product and adding an aqueous solution of tetrakis(hydroxymethyl)phosphonium chloride and an organic trivalent nitrogen-containing compound to said solution.

17. A process for flameproofing a fabric which comprises impregnating said fabric with the composition produced by the process of claim 16, drying the impregnated fabric, and then insolubilizing the impregnant in situ at an elevated temperature.

References Cited in the file of this patent

UNITED STATES PATENTS

| 2,660,543 | Walter et al. | Nov. 24, 1953 |
| 2,668,096 | Reeves et al. | Feb. 2, 1954 |
| 2,686,768 | Frick | Aug. 17, 1954 |

OTHER REFERENCES

Hoffman: Journ. Amer. Chem. Soc., vol. 52, July 1930, pages 2995–2998.

UNITED STATES PATENT OFFICE
Certificate of Correction

Patent No. 2,861,901

November 25, 1958

Wilson A. Reeves et al.

It is hereby certified that error appears in the printed specification of the above numbered patent requiring correction and that the said Letters Patent should read as corrected below.

Column 9, lines 63 and 64, for that portion of the title to Example I in italics, reading "A bromine containing nitrilo methylol-phosphorus polyan" read —A polymeric addition product of a polyhalomethane and a— in italics.

Signed and sealed this 28th day of April 1959.

[SEAL]

Attest:
T. B. MORROW,
*Attesting Officer.*

ROBERT C. WATSON,
*Commissioner of Patents.*